(12) United States Patent
LaPorte et al.

(10) Patent No.: US 8,899,363 B1
(45) Date of Patent: Dec. 2, 2014

(54) VEHICLE HOOD HINGE STRUCTURE

(71) Applicant: Nissan North America, Inc., Franklin, TN (US)

(72) Inventors: John-Paul LaPorte, Farmington Hills, MI (US); Scott W. Nydam, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 23 days.

(21) Appl. No.: 13/949,730

(22) Filed: Jul. 24, 2013

(51) Int. Cl.
*B62D 25/10* (2006.01)
*B62D 25/12* (2006.01)
*E05D 7/00* (2006.01)

(52) U.S. Cl.
CPC *B62D 25/12* (2013.01); *E05D 7/00* (2013.01); *B62D 25/105* (2013.01)
USPC .......................................................... 180/69.2

(58) Field of Classification Search
USPC ................ 180/69.2, 69.21, 274; 296/193.11; 16/221, 222, 361
See application file for complete search history.

(56) References Cited

U.S. PATENT DOCUMENTS

| | | | |
|---|---|---|---|
| 3,815,176 A * | 6/1974 | Porter | 16/288 |
| 4,012,807 A | 3/1977 | Kern | |
| 5,718,019 A * | 2/1998 | Cheal | 16/388 |
| 7,506,716 B1 * | 3/2009 | Salmon et al. | 180/274 |
| 8,336,666 B2 * | 12/2012 | Thomas | 180/274 |
| 2009/0146456 A1 * | 6/2009 | Saitou et al. | 296/187.09 |
| 2010/0101048 A1 * | 4/2010 | Thomas | 16/223 |
| 2010/0193277 A1 | 8/2010 | Boggess et al. | |
| 2011/0031056 A1 | 2/2011 | Takahashi et al. | |
| 2012/0074715 A1 | 3/2012 | Kim | |

* cited by examiner

*Primary Examiner* — J. Allen Shriver, II
*Assistant Examiner* — James Triggs
(74) *Attorney, Agent, or Firm* — Global IP Counselors, LLP (57) ABSTRACT

A hood hinge structure includes a body attachment part, a hood attachment part and a hinge part connecting the hood attachment part to the body attachment part at a first location. The body attachment part has a contact portion formed thereon and the hood attachment part has a restraining member formed thereon. The contact portion engages the restraining member at a second location forward of the first location relative to a vehicle longitudinal direction to restrain movement of the hood attachment part relative to the body attachment part upon application of a prescribed force on at least one of the body attachment part and the hood attachment part where at least one of the body attachment part and the hood attachment part is moved in a lateral direction to a deformed state while the hood attachment part is in the closed position.

18 Claims, 12 Drawing Sheets

VEHICLE HOOD HINGE STRUCTURE

BACKGROUND

1. Field of the Invention

The present invention generally relates to a vehicle hood hinge structure. More specifically, the present invention relates to a vehicle hood hinge structure with a movement restricting configuration that restricts upward movement of the rear portion of the hood during an impact event.

2. Background Information

Vehicle body structures are regularly being redesigned to include structural features that absorb impact forces in response to impact events. There are impact event tests that include impacting a moving vehicle with a fixed barrier. One such test includes providing a vehicle velocity in a vehicle longitudinal direction (forward momentum) such that a front corner of the vehicle (approximately 25 percent of the overall width of the vehicle) impacts a fixed, rigid barrier. The rigid barrier can include a flat surface that is perpendicular to the vehicle longitudinal direction or can be angularly offset relative to the vehicle longitudinal direction. During such impact tests, the hood of the vehicle is typically deformed and a rear edge and rear corner of the hood can become elevated and move rearward and/or laterally, depending upon the orientation of the surface of the rigid barrier.

SUMMARY

One object of the disclosure is to provide a vehicle with a hood movement limiting arrangement configured to restrict upward and/or lateral movement of a rear edge and rear corner of the hood during an impact event.

In view of the state of the known technology, one aspect of the disclosure includes a vehicle hood hinge structure that has a body attachment part configured to attach to a vehicle body structure, a hood attachment part configured to attach to a vehicle hood and a hinge part connecting the hood attachment part to the body attachment part at a first location for movement between a hood closed position and a hood open position. One of the body attachment part and the hood attachment part has a restraining member formed thereon. The other of the body attachment part and the hood attachment part has a contact portion formed thereon. The restraining member is located adjacent the contact portion while the hood attachment part is in the hood closed position such that the contact portion engages the restraining member at a second location forward of the first location relative to a vehicle longitudinal direction to restrain movement of the hood attachment part relative to the body attachment part upon application of a prescribed force on at least one of the body attachment part and the hood attachment part where at least one of the body attachment part and the hood attachment part is moved in a lateral direction to a deformed state while the hood attachment part is in the closed position.

BRIEF DESCRIPTION OF THE DRAWINGS

Referring now to the attached drawings which form a part of this original

DISCLOSURE

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
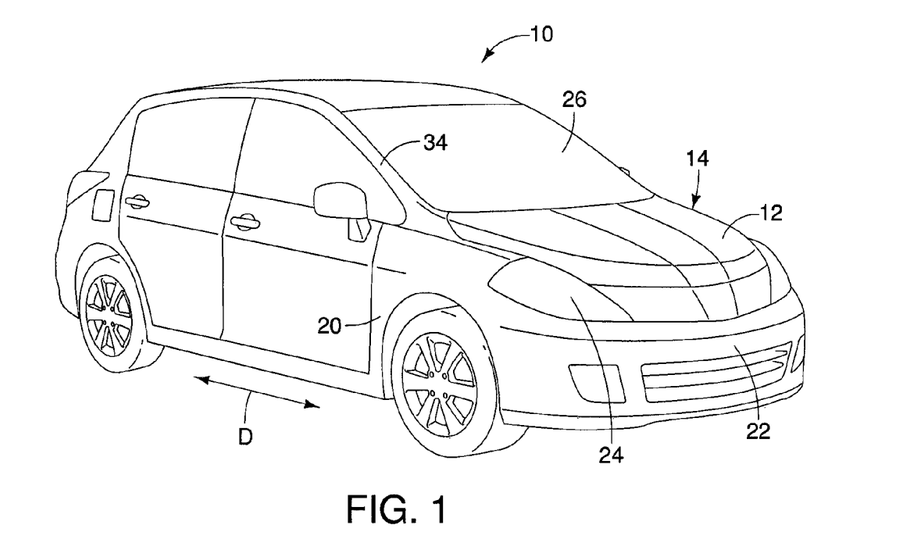
FIG. 1 is a perspective view of a vehicle provided with a hood movement limiting arrangement, with the hood in a closed position in accordance with the various embodiments.
Figure 2:
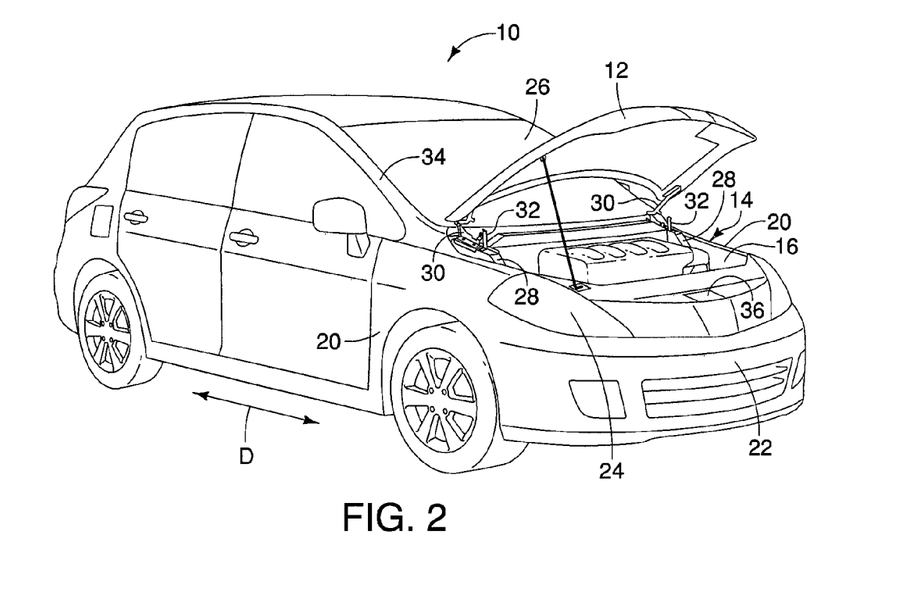
FIG. 2 is another perspective view of the vehicle with the hood in an open position showing an area around one of the hinges that supports the hood and showing the hood movement limiting arrangement in accordance with the various embodiments.

Referring initially to FIG. 1, a vehicle 10 is illustrated in accordance with the various embodiments, the vehicle having a hood 12 shown in a closed position in FIG. 1 and in an open position in FIG. 2. The vehicle 10 includes a front end structure 14 (described below) that limits movement of the hood 12 in response to impact events that can cause a rearward end of the hood 12 to move rearwardly, upwardly and/or laterally relative to a vehicle longitudinal direction D. The front end structure 14 is configured to limit movement of the hood 12 locations corresponding to opposite sides of a rear area of an engine compartment 16 of the vehicle 10, as is described below. However, the front end structure 14 at only one side of the rear area of the engine compartment 16 is described hereinbelow for the sake of brevity, since the two sides of the vehicle 10 are basically the same, except that they are symmetrical mirror images of one another.

Figure 9:
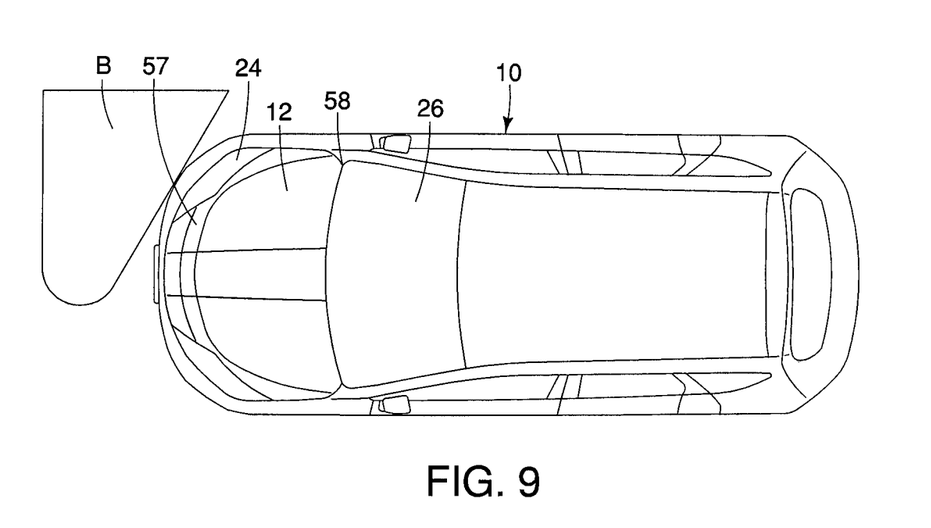
FIG. 9 is a top schematic view of the vehicle aligned with a rigid barrier prior to an impact event in accordance with the various embodiments.
Figure 10:
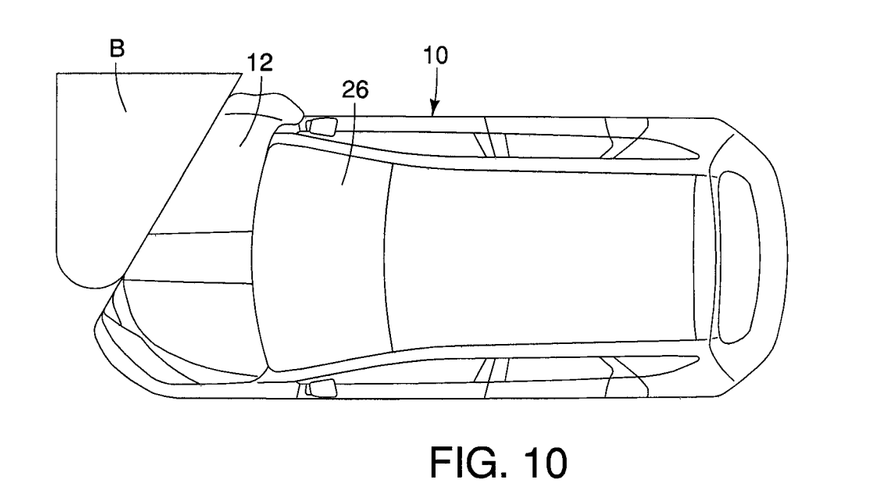
FIG. 10 is another top schematic view of the vehicle showing the vehicle immediately after the impact event with the rigid barrier in accordance with the various embodiments.

There are two embodiments of the hood movement limiting structures of the front end structure described below. The first embodiment is depicted in FIGS. 2-8 and 11-15, and the second embodiment is depicted in FIGS. 16-19. FIGS. 1 and 9-10 are provided to understand the object and usefulness of each of the two embodiments.

As shown in FIG. 2, the front end structure 14 of the vehicle 10 basically includes fenders 20, a front bumper assembly 22, headlamp assemblies 24, a windshield 26, hood ledges 28, hinges 30, the hood 12, restraining members 32, an A-pillar 34 and a hood latching mechanism 36. As mentioned above, only one side of the front end structure 14 is described herein.

The fender 20, the front bumper assembly 22, the headlamp assembly 24, the windshield 26, the A-pillar 34 and the hood latching mechanism 36 are all conventional features of the vehicle 10. Therefore, further detailed description of these elements is omitted for the sake of brevity.

Figure 3:
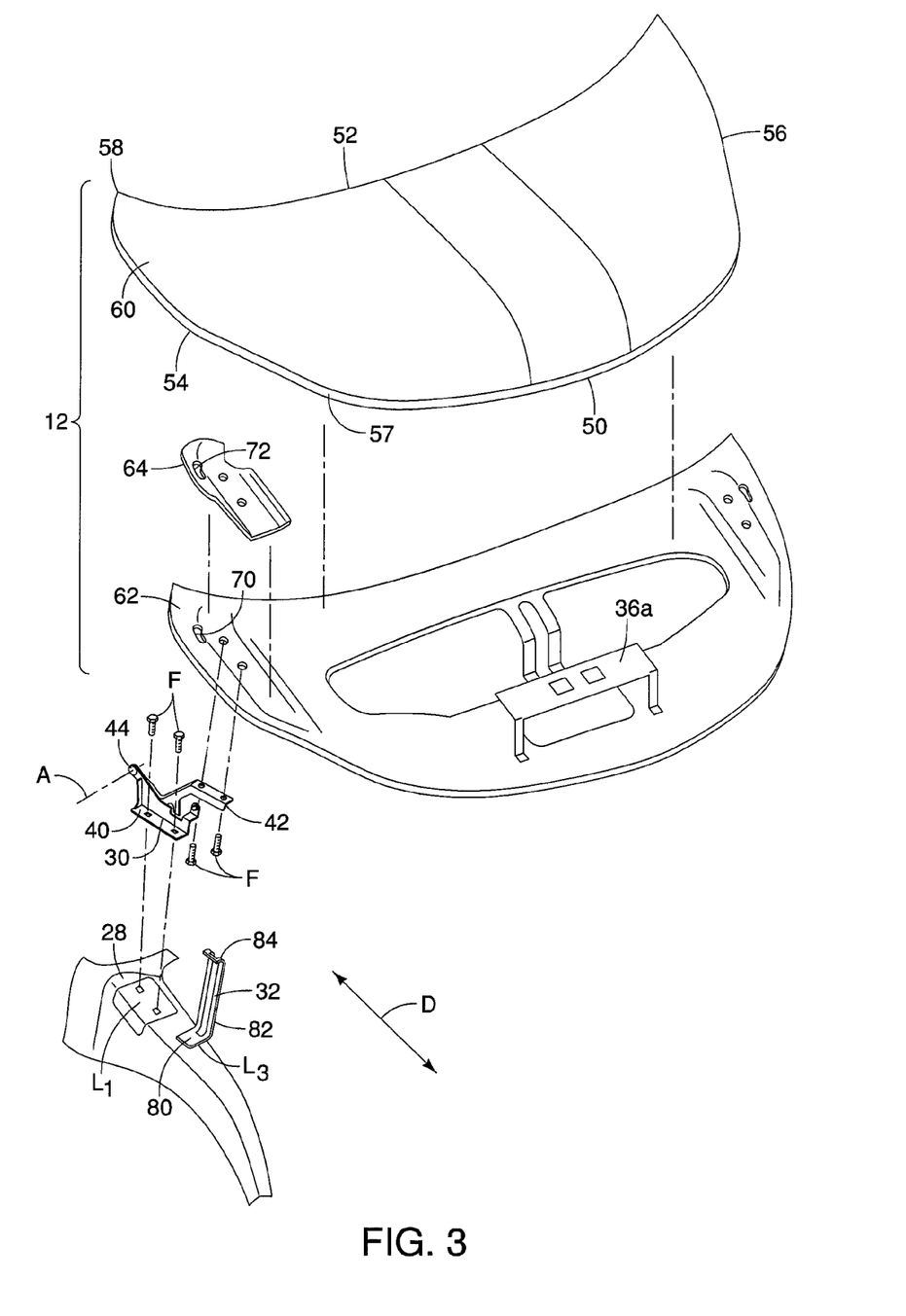
FIG. 3 is an exploded view of a portion of the vehicle depicted in FIGS. 1 and 2, showing a hood ledge, one of the hinges, a restraining member, a hood interior panel, a hood exterior panel and reinforcing bracket in accordance with a first embodiment.
Figure 4:
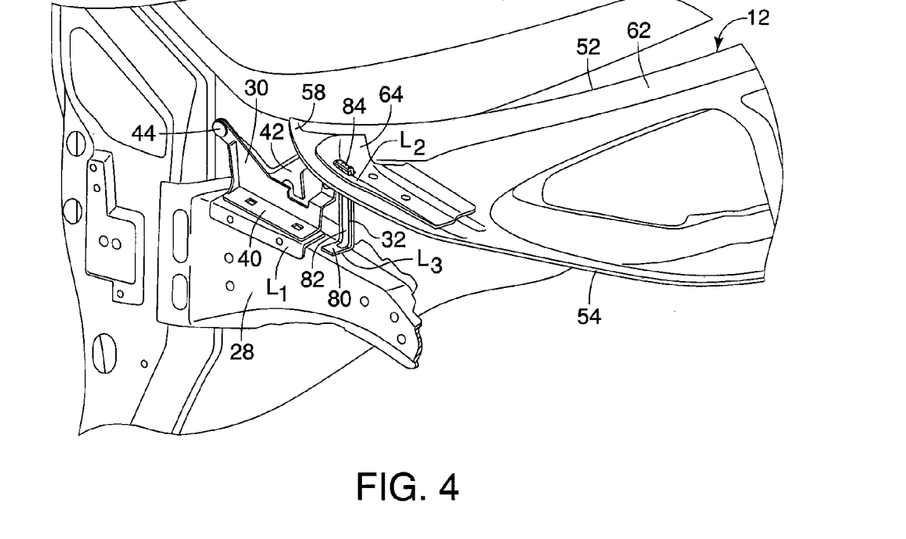
FIG. 4 is a perspective view of a portion of the vehicle with fenders and hood exterior panel removed showing the hood ledge, the hinge, the restraining member, the hood interior panel and the reinforcing bracket in accordance with the first embodiment.

The hood ledge 28 is a rigid structural member that extends from an A-pillar 34 of the vehicle 10 forward to a point proximate the front bumper assembly 22 in a conventional manner. Although not shown, the hood ledge 28 is attached to various structural elements that support the front bumper assembly 22, and various elements within the engine compartment 16. As shown in FIG. 3, the hood ledge 28 extends in the vehicle longitudinal direction D.

As shown in FIG. 3, the hinge 30 of the first embodiment includes a body attachment part 40 and a hood attachment part 42 that pivots relative to the body attachment part 40 about a connecting portion 44 (a pivot pin 44) that defines a pivot axis A. The body attachment part 40 is attached to an upper surface of the hood ledge 28 by removable fasteners F, and the hood attachment part 42 is similarly attached to the hood 12 by removable fasteners F.

In the depicted embodiment, the connecting portion 44 of the hinge 30 is a single pivot axis pivot pin. However, it should be understood from the drawings and the description herein that the connecting portion 44 can include a more kinematically complex hood movement arrangement with multiple pivot points and a multi-pivot pin arrangement such as a four-bar linkage. However, for simplicity, a single pivot pin connecting portion 44 is shown as part of the hinge 30.

As is also shown in FIG. 3, the hood 12 includes a front edge 50, a rear edge 52, a first side edge 54 and a second side edge 56, with the first side edge 54 and the front edge 50 defining a front corner 57 and the first side edge 54 and the rear edge 52 defining a rear corner 58. As is shown in FIGS. 2 and 3, the hinge 30 is located proximate the rear corner 58 of the hood 12. The hood 12 is fixed to the hood attachment part 42 for movement between a closed position and an open position with respect to the hood ledge 28. The hood 12 also includes an exterior panel 60, an interior panel 62 rigidly attached to an underside of the exterior panel 60 and a reinforcement panel 64 that is rigidly attached to an upper side of the interior panel 62.

The interior panel 62 is rigidly attached to an underside of the exterior panel 60 by, for example, welding, defining a cavity therebetween. The interior panel 62 has contoured shapes throughout its surface to provide strength and rigidity to the hood 12, in a conventional manner. The interior panel 62 includes apertures that receive the fasteners F for attachment to the hood attachment part 42 of the hinge 30. The interior panel 62 also includes an aperture 70 that is described further below. Further, the interior panel 62 includes a hood latch striker portion 36a that connects to the hood latching mechanism 36 with the hood 12 in the closed position, in a conventional manner.

The reinforcement panel 64 is rigidly attached to the upper side of the interior panel 62 by, for example, welding. The reinforcement panel 64 includes apertures that also receive the fasteners F that secure the hood 12 to the hood attachment part 42 of the hinge 30, the apertures being aligned with the apertures in the interior panel 62. The reinforcement panel 64 also includes an aperture 72 that is aligned with the aperture 70 in the interior panel 62. Since the aperture 72 and the aperture 70 are aligned, the surfaces that define the apertures 70 and 72 are aligned. Further, the surfaces that define the apertures 70 and 72 basically provide similar or the same structural features as described below. Therefore, all further description of the surfaces of the aperture 72 of the reinforcement panel 64 apply equally to the surfaces of the aperture 70 in the interior panel 62.

Figure 19:
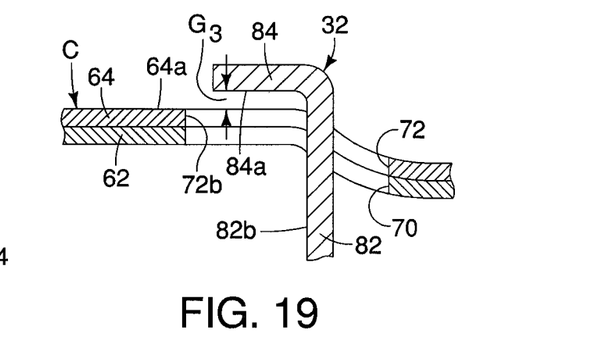
FIG. 19 is a cross-sectional view of the portion of the hood shown in FIG. 16 showing the reinforcement panel and the restraining member in a non-contacting orientation with the hood in the closed position, prior to an impact event in accordance with the first embodiment.
Figure 20:
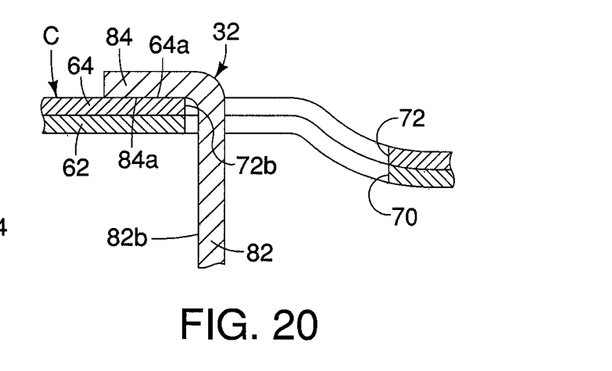
FIG. 20 is a cross-sectional view of the portion of the hood shown in FIG. 17 showing the restraining member contacting the reinforcement panel restricting upward movement of the rear corner of the hood in accordance with the first embodiment.

As shown in FIGS. 3-7, the restraining member 32 is basically a bracket that includes an attachment part 80 that is fixed to the hood ledge 28, an extension part 82 extending upward from the attachment part 80 towards the hood 12 and a flange part 84 extending in an outboard direction from the extension part 82. The flange part 84 basically defines a hook-like shape. The extension part 82 of the restraining member 32 includes a forward facing surface 82a and an outboard facing surface 82b. The flange part 84 has a downwardly facing surface 84a (FIGS. 19 and 20).

Figure 8:
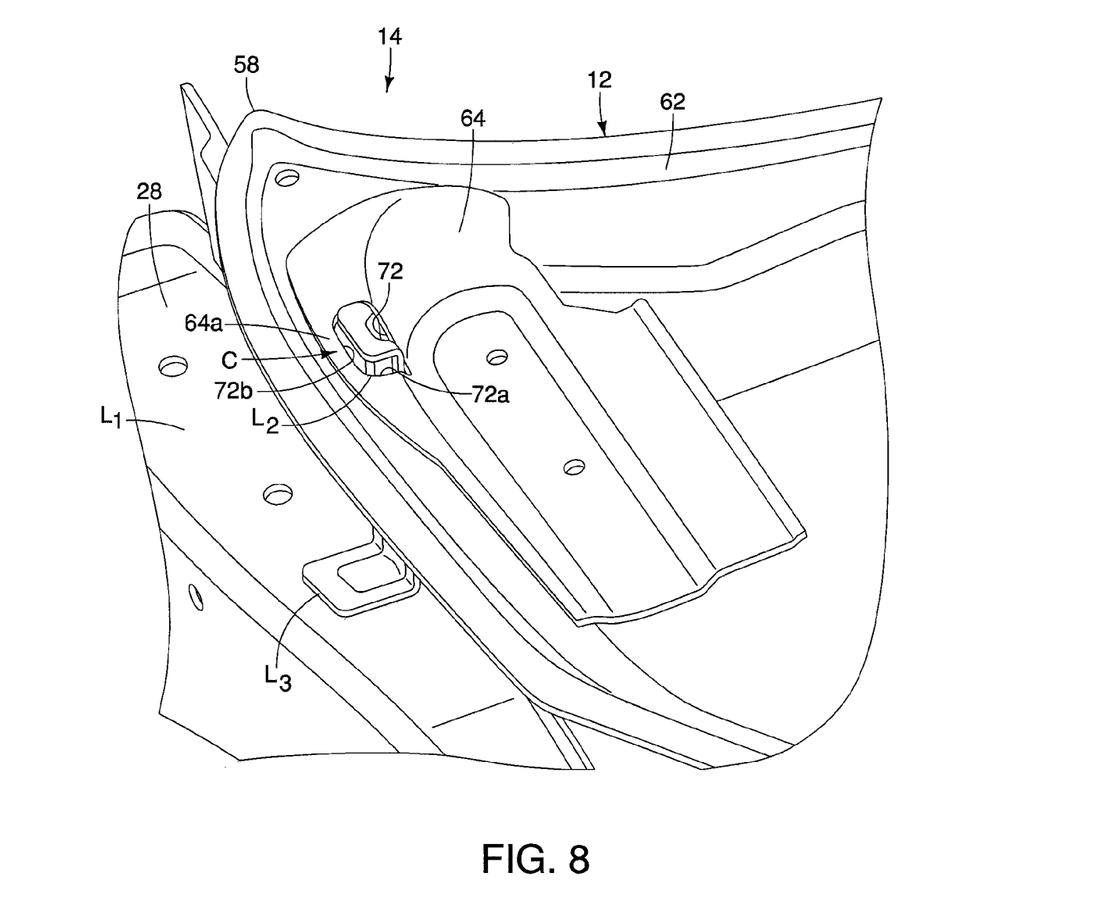
FIG. 8 is another perspective view of the portion of the vehicle showing hood ledge, the restraining member, the hood interior panel and the reinforcement panel with an upper end of the restraining member extending through an aperture in the hood interior panel and extending through another aperture in the reinforcement panel with the hood in the closed position in accordance with the first embodiment.

As shown in FIG. 8, the aperture 72 of the reinforcing panel 64 is at least partially defined by a rearward facing surface 72a and a laterally or inboard facing surface 72b. Further, the reinforcement panel 64 includes an upwardly facing surface 64a adjacent to the aperture 72 and the inboard facing surface 72b.

As is described further below, features of the restraining member 32 and the hood 12 define a hood movement limiting arrangement. Specifically, the restraining member 32, which is attached to one of the hood ledge 28 and the hood 12, and a contact portion C formed on the other of the hood ledge 32 and the hood 12. In the depicted embodiment the restraining member 32 is attached to the hood ledge 28 and the contact portion C is defined on the hood 12. However, it should be understood from the drawings and the description herein that their respective locations can be reversed. Specifically, the restraining member 32 can be attached to an underside of the hood 12 and the contact portion C can be defined on the hood ledge 28.

One aspect of the hood movement limiting arrangement is that the hinge 30 is attached to the hood ledge 28 at a first location $L_1$, as shown in FIG. 8. However, the hinge 30 has been removed in FIG. 8 for clarity.

Figure 5:
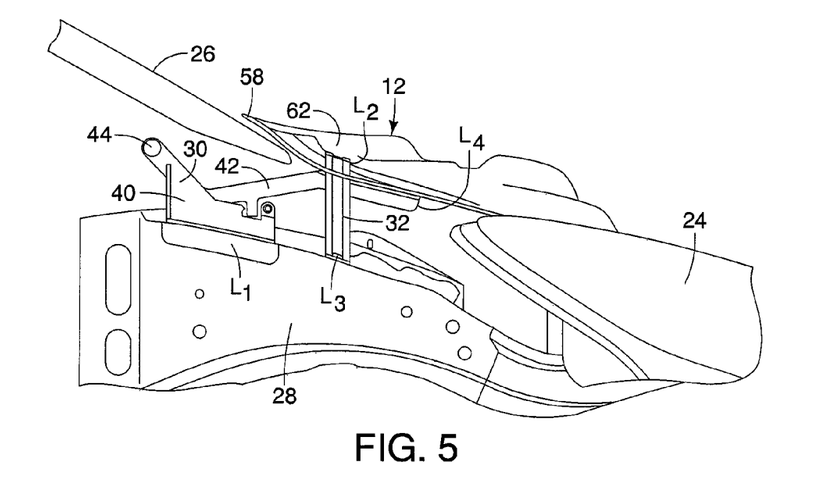
FIG. 5 is a side view of the portion of the vehicle with fenders removed showing the hood ledge, the hinge, the restraining member, the hood interior panel and the reinforcing bracket in accordance with the first embodiment.
Figure 6:
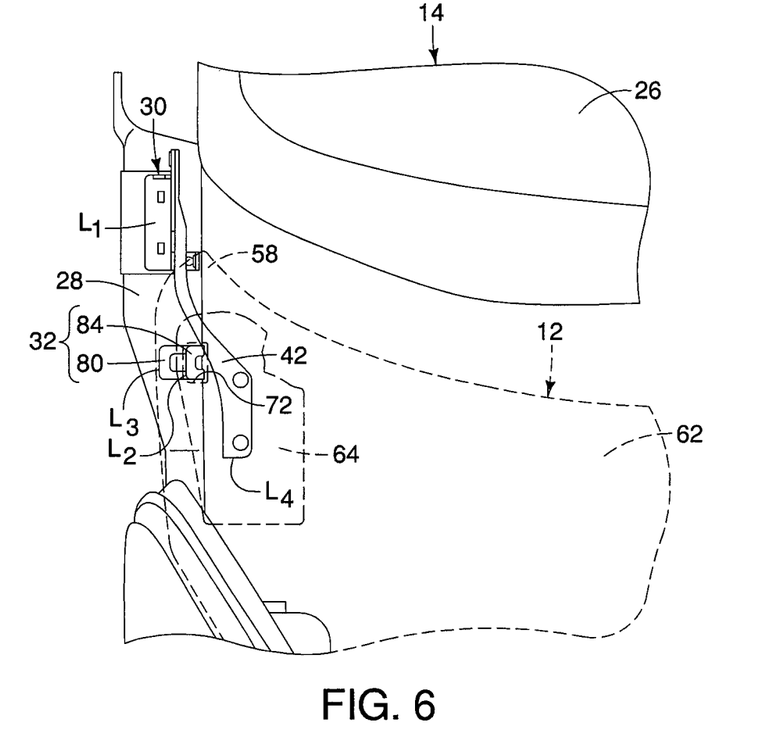
FIG. 6 is a top view of the portion of the vehicle showing the hood ledge, the hinge and the restraining member with the hood interior panel and the reinforcement panel in phantom in accordance with the first embodiment.
Figure 7:
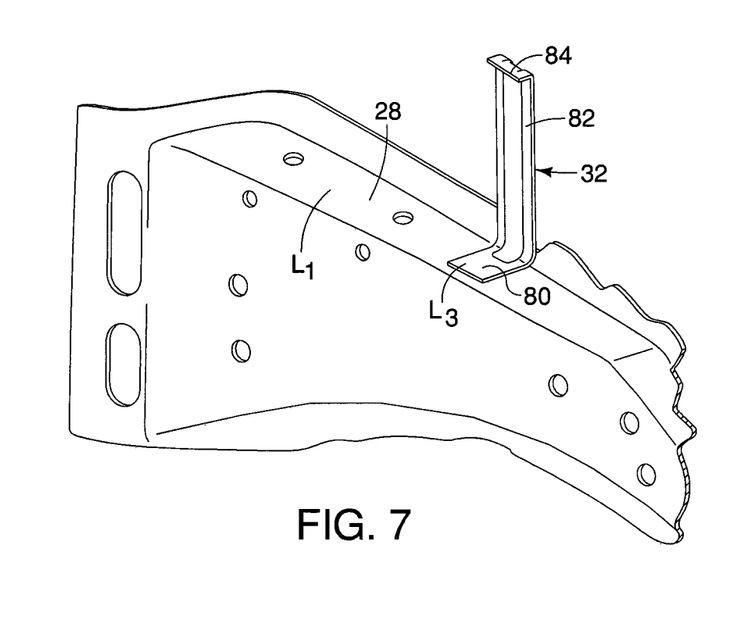
FIG. 7 is a perspective view of the hood ledge and the restraining member shown removed from the vehicle in accordance with the first embodiment.

In the depicted embodiment, the contact portion C is located at a second location $L_2$ within the structure of the hood 12 in the vicinity of the aperture 72 (and aperture 70) while the hood 12 is in the closed position. The restraining member 32 is located at a third location $L_3$ that is forward from the location $L_1$. With the hood 12 in an undeformed state and in the closed position as shown in FIG. 8, the extension part 82 is located within the apertures 70 and 72 and the flange part 84 is located above the reinforcement panel 64. Also, as shown in FIGS. 5 and 6, a forward end of the hood attachment part 42 is at a location $L_4$ that is forward of the locations $L_1$, $L_2$ and $L_3$ in the vehicle longitudinal direction D.

However, in response to an impact event, the hood 12 can deform. As a result of the deformation of the hood 12, the contact portion C can engage the restraining member 32 at the second location $L_2$ forward of the first location $L_1$ relative to the vehicle longitudinal direction D to restrain movement of the rear corner 58 of the hood 12 relative to the hood ledge 28 upon application of a prescribed force on the front corner 57 of the hood 12. It should be understood that the hood 12 can deform in one or both a rearward direction and an inboard direction while the hood 12 is in the closed position.

Figure 11:
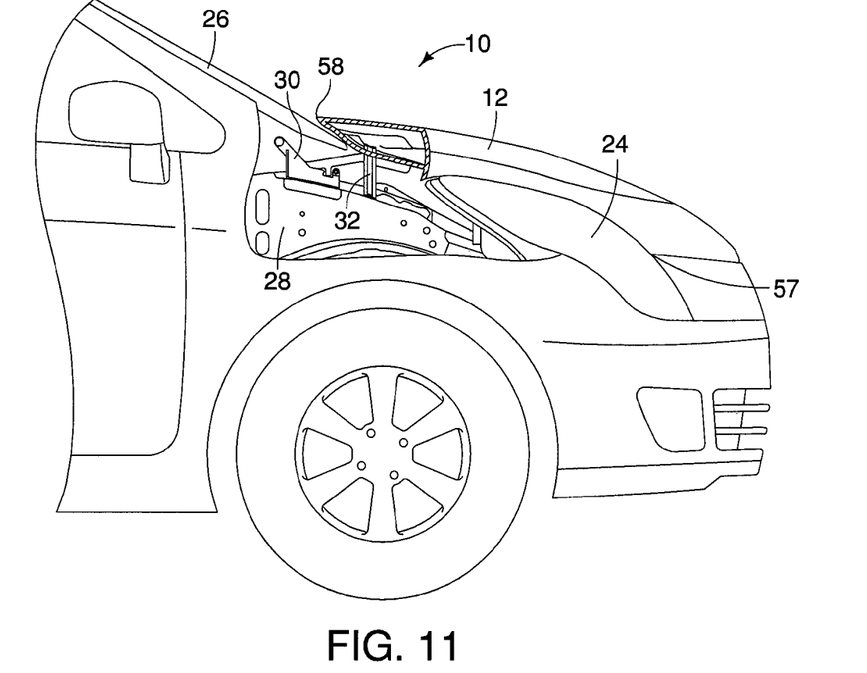
FIG. 11 is a side schematic view of the vehicle with a portion of the fender and exterior hood panel cutaway revealing the hood ledge, the hinge, the restraining member and the hood interior panel prior to the impact event in accordance with the first embodiment.
Figure 12:
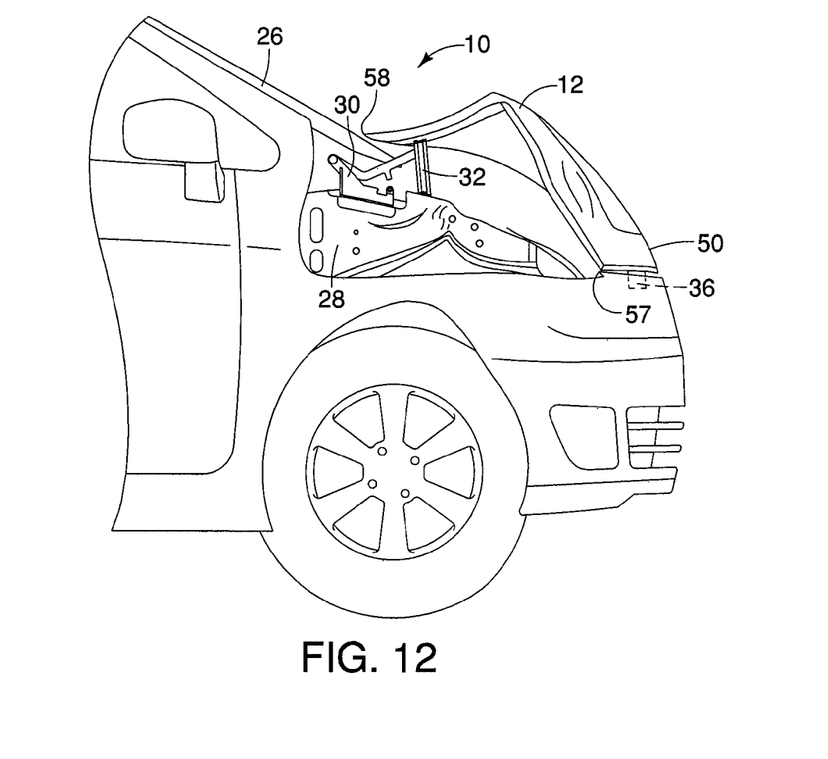
FIG. 12 is another side schematic view of the vehicle similar to FIG. 11 with the portion of the fender and exterior hood panel cutaway revealing the hood ledge, the hinge, the restraining member and the hood interior panel immediately after the impact event in accordance with the first embodiment.

FIGS. 9 through 12 are included to provide a representation of the possible deformation that can be experienced by the hood 12 during an impact event. As shown in FIG. 9, the vehicle 10 is provided with forward momentum (speed) and moves toward a rigid barrier B. Upon impact, as shown in FIG. 10, the vehicle 10 and the hood 12 undergo deformation. FIG. 11 shows the hood 12 in an undeformed state, corresponding to the vehicle 10 as depicted in FIG. 9. In FIG. 12, portions of the front end structure 14 of the vehicle 10, including the hood 12, have deformed. During the deformation process, the restraining member 32 interacts with the contact portion C The contact portion C is defined by, for example, the rearward facing surface 72a and the laterally facing surface 72b of the reinforcement panel 64 and the upwardly facing surface 64a of the reinforcement panel 64. The type of deformation that the hood 12 experiences during the impact event, determines the interaction between the contact portion C and the restraining member 32.

Figure 13:
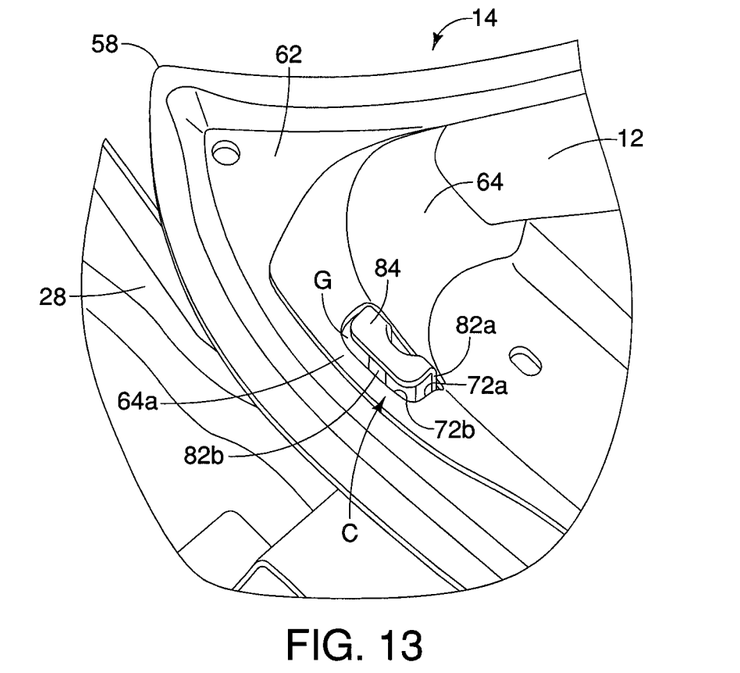
FIG. 13 is a perspective view of the portion of the vehicle showing the hood ledge, the hood interior panel, the reinforcement panel and the upper end of the restraining member extending through the aligned apertures of the hood interior panel and the reinforcement panel prior to the impact event in accordance with the first embodiment.
Figure 16:
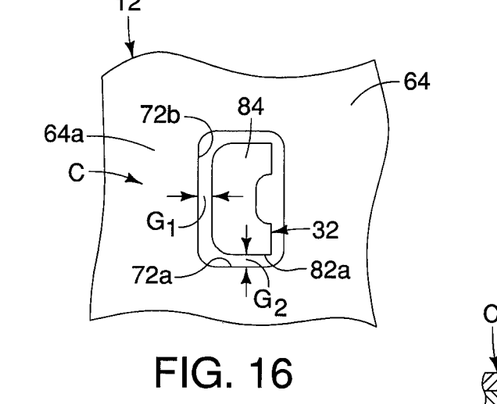
FIG. 16 is a top cut-away view of a portion of the hood with the exterior panel of the hood removed, showing the reinforcement panel and the restraining member in a non-contacting orientation with the hood in the closed position, prior to an impact event in accordance with the first embodiment.

As shown in FIGS. 13, 16 and 19, with the hood 12 in an undeformed state and in the closed position, the restraining member 32 extends through the aperture 72 (and aperture 70) in a non-contacting manner. Further, a clearance or gap is established between surfaces of the restraining member 32 and the surfaces of the aperture 72. Specifically, as shown in FIGS. 13 and 16, between the flange part 84 or the extension part 82 of the restraining member 32 and the inboard facing surface 72b of the aperture 72, there is a clearance or gap $G_1$ in a vehicle lateral direction. There is also a gap $G_2$ defined between the rearward facing surface 72a of the aperture 72 and the forward facing surface 82a of the extension part 82 of the restraining member 32, and a gap $G_3$ defined between the upwardly facing surface 64a of the reinforcement panel 64 and the downwardly facing surface 84a of the flange 84 of the restraining member 32, while the hood 12 is in the closed position. The gaps $G_1$, $G_2$, and $G_3$ can be in the range of 3 to 15 millimeters, but most preferably 3 to 10 millimeters, to provide clearance for free movement of the hood 12 between the opened position and closed position while the hood 12 is in a non-deformed state.

The rearward facing surface 72a and the laterally facing surface 72b of the aperture 72 of the reinforcement panel and the upwardly facing surface 64a of the reinforcement panel 64 all define an upper part of the contact portion C. Corresponding surfaces of the aperture 70 of the interior panel 62 define a lower part of the contact portion C.

Figure 14:
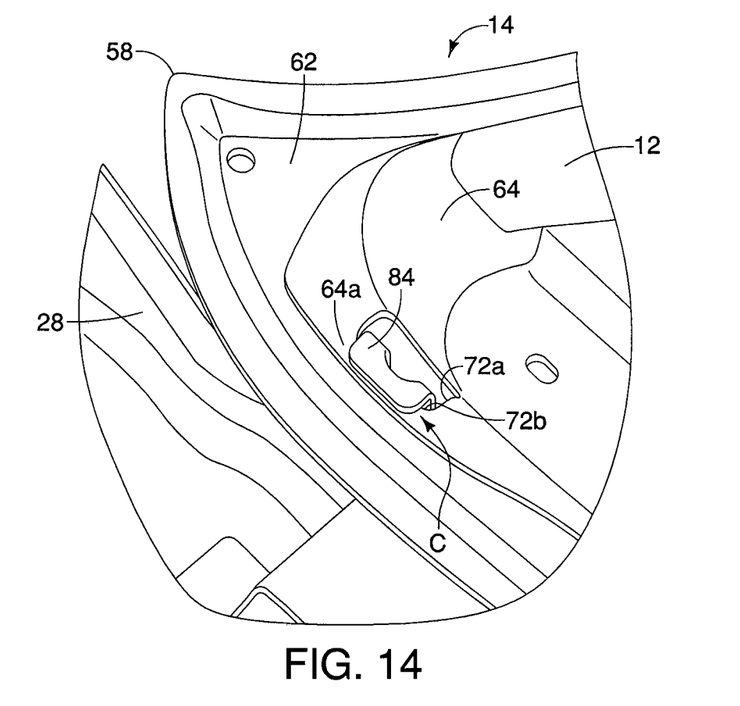
FIG. 14 is another perspective view of the portion of the vehicle after an impact event that causes the hood to move laterally, showing the upper end of the restraining member contacting a lateral surface of the apertures in the hood interior panel and the reinforcement panel in accordance with the first embodiment.
Figure 17:
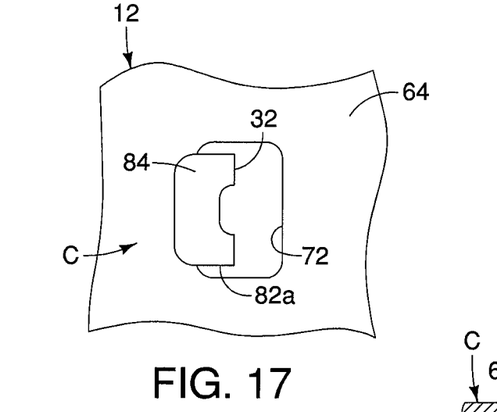
FIG. 17 is another top cut-away view of the portion of the hood shown in FIG. 16, showing the reinforcement panel and the restraining member with the hood in the closed position, after an impact event with the restraining member contacting the reinforcement panel restricting upward movement of the rear corner of the hood in accordance with the first embodiment.

As shown in FIGS. 14, 17 and 20, as the hood 12 undergoes deformation in a lateral (inboard) direction, the contact portion C moves in an inboard or lateral direction (to the right relative to FIGS. 14, 17 and 20). Thus, the inboard facing surface 72b of the aperture 72 can be brought into contact with the outboard facing surface 82b of the extension part 82, and the upwardly facing surface 64a of the reinforcement panel 64 can be brought into contact with the downwardly facing surface 84a of the flange 84.

Further, as indicated in FIG. 12, during the impact event, the hood 12 is crumpled and folds in a central section thereof.

Several forces acting on the hood 12 cause the hood 12 to deform in a manner consistent with the representation in FIG. 12. First, the hood latch mechanism 36 prevents upward movement of the front edge 50 of the hood 12. The hinge 30 also has some effect on restricting upward movement of the rear corner 58 of the hood 12. However, the inclusion of the restraining member 32 has an even greater movement restricting effect on the rear corner 58 of the hood 12. As shown in FIGS. 14, 17 and 20, the hood 12 and in particular, the surface that define the apertures 70 and 72, move laterally inboard such that the flange part 84 is located above the upwardly facing surface 64a of the reinforcement panel 64. Depending upon the force of the impact event, as shown in FIG. 20, the downwardly facing surface 84a of the restraining member 32 contacts the upwardly facing surface 64a of the reinforcement panel 64 and severely restricts or limits further upward movement of the rear corner 58 and the rear edge 52 of the hood 12.

Figure 15:
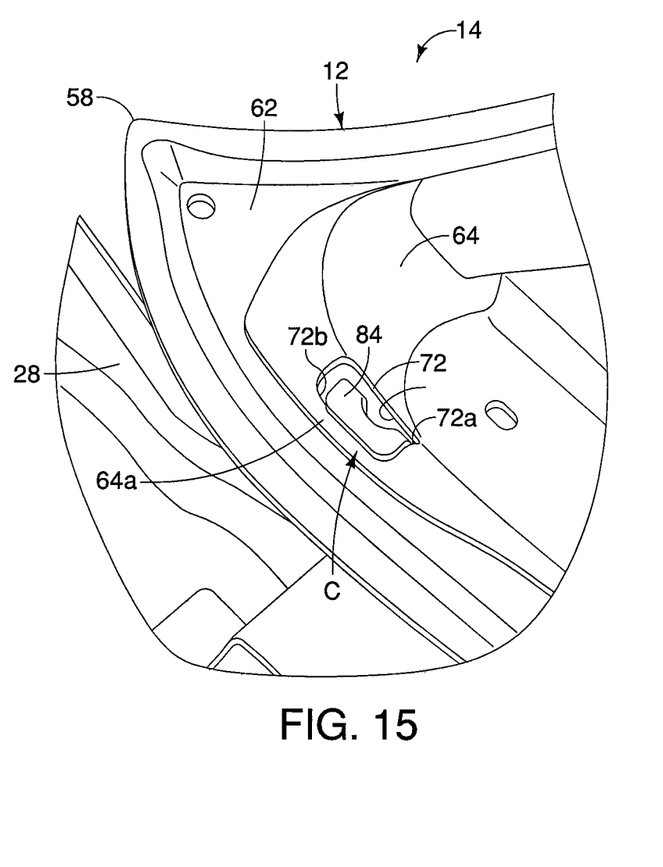
FIG. 15 is yet another perspective view of the portion of the vehicle after an impact event that causes the hood to move rearward, showing the upper end of the restraining member contacting a forward surface of the apertures in the hood interior panel and the reinforcement panel in accordance with the first embodiment.
Figure 18:
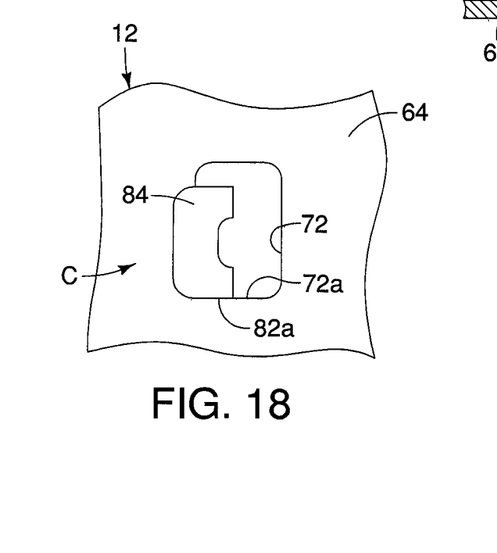
FIG. 18 is another top cut-away view of the portion of the hood shown in FIG. 16, showing the reinforcement panel and the restraining member with the hood in the closed position, after an impact event with the restraining member contacting the reinforcement panel restricting rearward and upward movement of the rear corner of the hood in accordance with the first embodiment.

The restraining member 32 and the contact portion C have a further function. As shown in FIGS. 15 and 18, during an impact event, forces acting on the hood 12 can move the hood 12 rearward such that the rearward facing surface 72 contacts the forward facing surface 82a of the extension part 82 of the restraining member 32.

Hence, the restraining member 32 is configured to limit upward movement of the rear corner 58 and the rear edge 52 of the hood 12, and the hood latching mechanism 36 is configured to limit upward movement of the front corner 57 and the front edge 50 of the hood 12 upon application of the prescribed rearward directed force on the front corner 57 such that a central area between the rear edge 52 and the front edge 50 of the hood 12 lifts and deforms as the front corner 57 moves rearward.

It should be understood from the drawings and the description herein that the restraining member 32 is located as close to the rear corner 58 as possible, but forward of the connecting portion 44 (pivot pin) of the hinge 30. Further, the restraining member 32 is clear of the hinge 30. More specifically, since the hood 12 is typically moved in a rearward direction and/or in an inboard direction relative to the body attachment part 40 of the hinge 30, the restraining member 32 is located outboard of the hood attachment part 42, such that there is no interference between the restraining member 32 and the hinge 30 during normal operation or during an impact event.

As is indicated in FIG. 5, the hood attachment part 42 of the hinge 30 attaches to the interior panel 62 at a point that is above the hood ledge 28. Further, as shown in FIG. 6, the hood attachment part 42 of the hinge 30 attaches to the interior panel 62 at a point that is inboard the hood ledge 28 and the restraining member 32.

One of the advantages of the inclusion of the restraining member 32 and its capability to limit upward movement of the rear corner 58 of the hood 12, is to prevent the hood 12 from contacting the windshield 26 in an undesirable area. Specifically, as the rear corner 58 of the hood 12 is restricted from moving upward, if the rear corner 58 of the hood 12 should contact the windshield 26, that contact is limited to lower regions of the windshield 26 adjacent to the instrument panel (not shown) of the vehicle 10. Hence, an impacting force transmitting from the hood 12 to the windshield 26 will be more easily absorbed by the instrument panel of the vehicle 10.

Second Embodiment

Referring now to FIG. 21 through 24, a vehicle hood movement limiting arrangement in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the vehicle hood movement limiting arrangement is part of the structure of a hinge 130. The hinge 130 can be installed in the vehicle 10, as described above in the first embodiment. Specifically, the hinge 30 of the first embodiment can be removed from the vehicle 10, and replaced with the hinge 130. The restraining member 32 can be removed in the second embodiment, or used in concert with the hinge 130.

The hinge 130 includes a body attachment part 140, a hood attachment part 142 and a hinge part 144. The body attachment part 140 is configured to be attached to the hood ledge 28 (part of a vehicle body structure such as front end structure 14) at a first location $L_1'$, as indicated in phantom lines in FIG. 21. The hinge part 144, which defines an axis A, is located at a second location $L_2'$.

One of the body attachment part 140 and the hood attachment part 142 has a restraining member 132 formed thereon, and the other of the body attachment part 140 and the hood attachment part 142 has a contact portion C' formed thereon. In the depicted embodiment, the contact portion C' is formed on the body attachment part 140 and the restraining member 132 is formed on the hood attachment part 142. However, it should be understood from the drawings and the description herein that the restraining member 132 can alternatively be formed on the body attachment part 140 and the contact portion C' can be formed on the hood attachment part 142.

Figure 21:
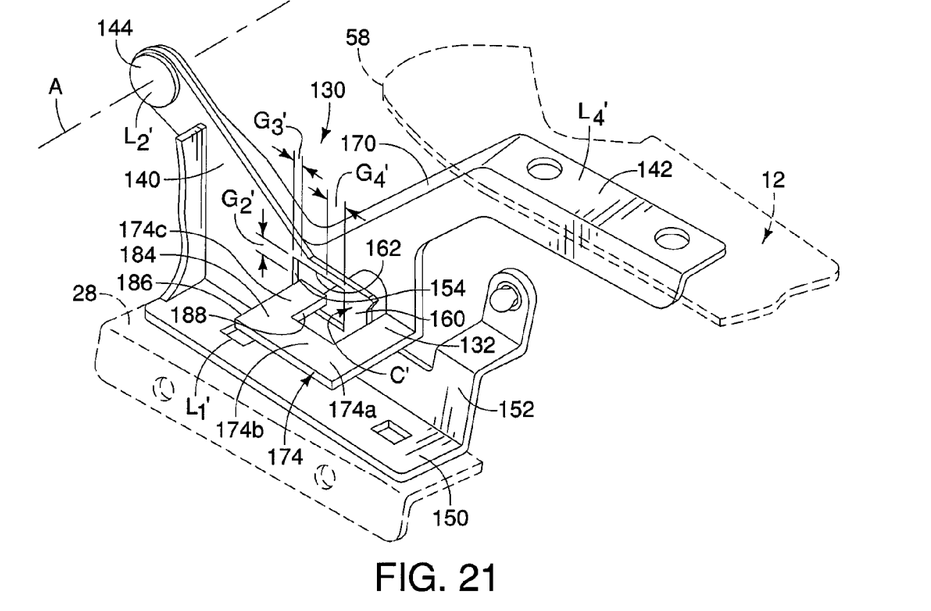
FIG. 21 is a perspective view of a hinge shown removed from the vehicle depicted in FIGS. 1 and 2, the hinge having a body attachment part, a hood attachment part and a restraining member in accordance with a second embodiment.
Figures 23, 24:
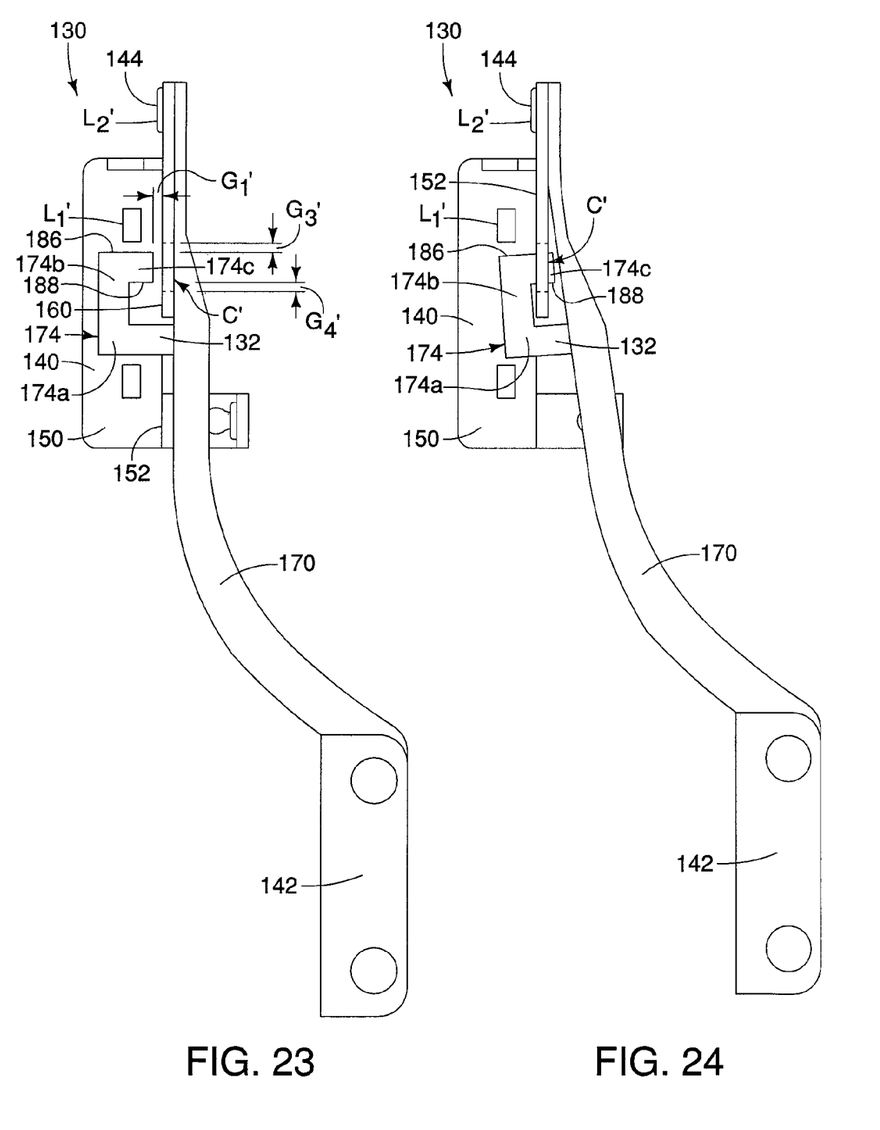
FIG. 23 is a top view of the hinge shown prior to the impact event showing the body attachment part, the hood attachment part and the restraining member in accordance with the second embodiment.
FIG. 24 is another top view of the hinge shown after an impact event where the hood attachment part has undergone deformation causing the restraining member to extend into the aperture in the body attachment part in accordance with the second embodiment.

As shown in FIGS. 21 and 23, the restraining member 132 is located adjacent the contact portion C' while the hood attachment part 142 is in the hood closed position. Further, the contact portion C' can engage the restraining member 132 at a third location $L_3'$ forward of the second location $L_2'$ relative to a vehicle longitudinal direction D to restrain movement of the hood attachment part 142 relative to the body attachment part 140 upon application of a prescribed force on at least one of the body attachment part 140 and the hood attachment part 142 where at least one of the body attachment part 140 and the hood attachment part 142 is moved in a lateral direction to a deformed state while the hood attachment part 142 is in the closed position.

The body attachment part 140 basically includes a first flange 150 that is horizontally oriented while attached to the hood ledge 28 (part of the vehicle body structure) and a second flange 152 extending upright from the first flange 150. An aperture 154 extends from one side of the second flange 152 to an opposing side of the second flange 152. The contact portion C' is defined by at least one surface of the second flange 152 and surfaces that define the aperture 154. More specifically, a first surface 160 is defined on the second flange 152 and positioned for contact with the restraining member 132 in response to the application of the prescribed force during an impact event. More specifically, the first surface 160 is an upright and outboard facing surface of the second flange 152. The contact portion C' is also defined by a downwardly facing surface 162 of the aperture 154.

The hood attachment part 142 is configured to attach to the hood 12, as is also indicated in phantom lines in FIG. 21. The hood attachment part 142 includes a main body 170 and the restraining member 132. A distal end of the hood attachment part 142 defines a fourth location $L_4'$ that is located forward of the first, second and third locations $L_1'$, $L_2'$ and $L_3'$. The main body 170 extends in a forward direction from the hinge part 144 relative to the vehicle longitudinal direction D along an inboard side of the body attachment part 140. The restraining member 132 includes an extension part 174 that extends in an outboard direction from the main body 170 to a location outboard of the second flange 152 of the body attachment part 140. Further, the extension part 174 of the restraining member 132 has an overall U-shape as viewed from above, such that the extension part 174 has a first leg 174a connected to the main body 170, a second leg 174b that extends in a direction perpendicular to the first leg 174a and a third leg 174c that extends back in an inboard direction toward the contact portion C' and the aperture 154. It should be noted, that with the hood attachment part 142 in the closed position, the extension part 174, including the first, second and third legs 174a, 174b and 174c, extends in a horizontal direction. Further, in the closed position, the third leg 174c extends toward the aperture 154, is aligned with the aperture 154, but is spaced apart from the aperture 154 and the second flange 152 of the body attachment portion 140 by a gap $G_1'$.

Figure 22:
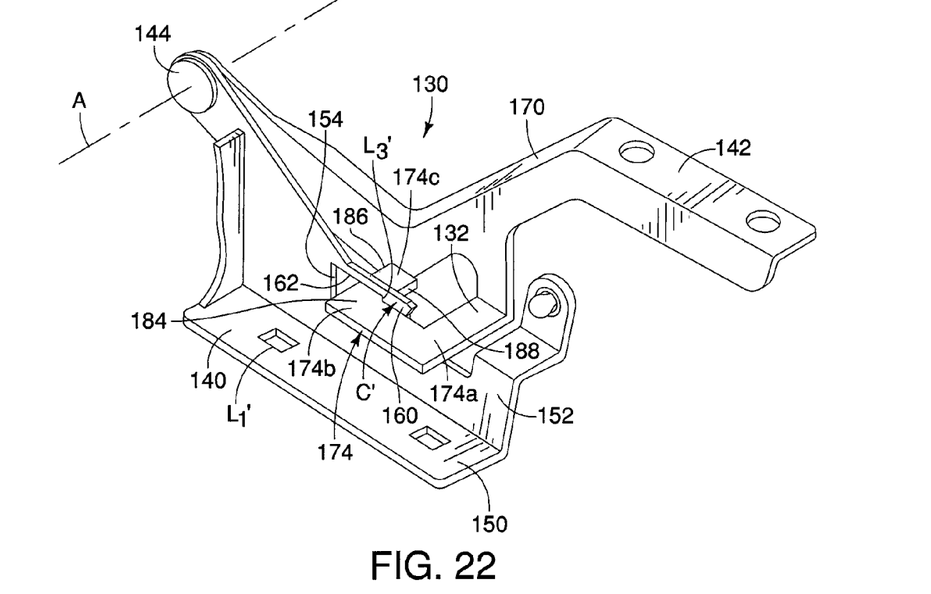
FIG. 22 is another perspective view of the hinge shown after an impact event where the hood attachment part has undergone deformation causing the restraining member to extend into an aperture in the body attachment part in accordance with the second embodiment.

During an impact event, the hood 12 deforms, as discussed above with respect to the first embodiment. Since the hood attachment part 142 is attached to a rear portion of the hood 12 proximate the rear corner 58, the hood attachment part 142 also deforms during the impact event, as indicated in FIGS. 22 and 24. Specifically, the hood attachment part 142 can bend thereby moving the extension part 170 inboard and moving an inboard facing surface 182 of the second leg 174b into contact with the first surface 160 of the first flange 150 of the body attachment part 140 in response to the application of the prescribed force during the impact event. This contact between the forward facing surface 182 of the second leg 174b with the first surface 160 of the body attachment part 140 limits lateral movement of the hood attachment part 142 in an inboard direction relative to the body attachment part 140. Hence, lateral movement of the rear corner 58 and the rear edge 52 of the hood 12 is restricted while the hood 12 deforms in response to a force applied to the front corner 57 of the hood 12.

Further, the deformation of the hood attachment part 142 causes the third leg 174c to move into the aperture 154. Once the third leg 174c is within the aperture 154, contact between an upwardly facing surface 184 of the third leg 174c and the downwardly facing surface 162 of the aperture 154 limits upward movement of the hood attachment part 142 upon the application of the prescribed rearward directed force on the hood attachment part 142. Hence, upward movement of the rear corner 58 and the rear edge 52 of the hood 12 is restricted while the hood 12 deforms in response to a force applied to the front corner 57 of the hood 12.

Additionally, once the third leg 174c is within the aperture 154, further deformation of the hood 12 may cause contact between a forward facing surface 186 of the first leg 174a and a rearward facing surface 164 of the aperture 154, or between a rearward facing surface 188 of the third leg 174a and a forward facing surface 166 of the aperture 154, upon the application of the prescribed rearward directed force on the hood attachment part 142, which can limit the longitudinal movement of the hood attachment part 142. Hence, longitudinal movement of the rear corner 58 and the rear edge 52 of the hood 12 is restricted while the hood 12 deforms in response to a force applied to the front corner 57 of the hood 12.

Furthermore, in the closed position, the third leg 174c extends toward and is aligned with the aperture 154, but the upwardly facing surface 184 is spaced apart in a vehicle vertical direction from the downwardly facing surface 162 of the aperture 154 by a gap $G_2'$, the forward facing surface 186 of the first leg 174a is spaced apart in the vehicle longitudinal direction from the rearward facing surface 164 of the aperture 154 by a gap $G_3'$, and the rearward facing surface 188 is spaced apart in the vehicle longitudinal direction from the forward facing surface 166 of the aperture 154 by a gap $G_4'$. The gaps $G_1'$, $G_2'$, $G_3'$, and $G_4'$ can be in the range of 3 to 15 millimeters, but most preferably 3 to 10 millimeters, to provide clearance for free movement of the hood attachment part 142 to move the hood 12 between the opened position and closed position while the hood 12 is in a non-deformed state.

As shown in FIGS. 21 and 23, the third leg 174c of the restraining member 132 is spaced apart from the second flange 152 and the aperture 154, and the second leg 174b is spaced apart from the first surface 160 while the hood attachment part 142 is in the closed position relative to the body attachment part 140. Therefore, the restraining member 132 has a non-contacting relationship with the body attachment part 140 while moving between the open position and the closed position.

Also, with the hood attachment part 142 in the closed position, the extension part 174 of the restraining member 132 is located above the first flange 150 (a main body) of the body attachment part 140.

There are various parts of the vehicle front end structure that are conventional components and are well known in the art. Since these various part are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle front end structure. Accordingly, these terms, as utilized to describe the present invention should be interpreted relative to a vehicle equipped with the vehicle front end structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle hood hinge structure comprising:
   a body attachment part configured to attach to a vehicle body structure;
   a hood attachment part configured to attach to a vehicle hood;
   a hinge part connecting the hood attachment part to the body attachment part at a first location for movement between a hood closed position and a hood open position; and
   one of the body attachment part and the hood attachment part having a restraining member formed thereon, and the other of the body attachment part and the hood attachment part having a contact portion formed thereon, the restraining member being located adjacent the contact portion while the hood attachment part is in the hood closed position such that the contact portion engages the restraining member at a second location forward of the first location relative to a vehicle longitudinal direction to restrain movement of the hood attachment part relative to the body attachment part upon application of a prescribed force on at least one of the body attachment part and the hood attachment part where at least one of the body attachment part and the hood attachment part is moved in a lateral direction to a deformed state while the hood attachment part is in the closed position.

2. The vehicle hood hinge structure according to claim 1, wherein
   the restraining member is fixed to the hood attachment part, and the contact portion is defined by a first surface of the body attachment part.

3. The vehicle hood hinge structure according to claim 2, wherein
   the body attachment part includes a first flange that is horizontally oriented while attached to a vehicle body structure, and second flange extending upright from the first flange, the first surface being defined on the second flange and positioned for contact with the restraining member in response to the application of the prescribed force.

4. The vehicle hood hinge structure according to claim 3, wherein
   the hood attachment part includes a main body that extends in a forward direction from the hinge part relative to the vehicle longitudinal direction along an inboard side of the body attachment part, and the restraining member includes an extension part that extends in an outboard direction from the main body to a location outboard of the second flange of the body attachment part.

5. The vehicle hood hinge structure according to claim 2, wherein
   the restraining member includes an extension part extending in a horizontal direction toward the first surface with the hood attachment part in the closed position relative to the body attachment part, the extension part being moved into contact with the first surface in response to the application of the prescribed force.

6. The vehicle hood hinge structure according to claim 5, wherein
   the hood attachment part includes a main body that extends in a forward direction from the hinge part along an inboard side of the body attachment part relative to the vehicle longitudinal direction, and the restraining member includes an extension part that extends in an outboard direction from the main body to a location outboard of a section of the body attachment part.

7. The vehicle hood hinge structure according to claim 6, wherein
   the extension part of the restraining member has a U-shape as viewed from above, the extension part having a first leg connected to the main body and a second leg that extends in an inboard direction toward the contact portion.

8. The vehicle hood hinge structure according to claim 2, wherein
   the first surface is a downwardly facing surface that engages the restraining member to limit upward movement of the hood attachment part upon the application of the prescribed force.

9. The vehicle hood hinge structure according to claim 8, wherein
   the restraining member includes an upward facing surface which engages the downward facing surface to limit upward movement of the hood attachment part upon the application of the prescribed rearward directed force.

10. The vehicle hood hinge structure according to claim 2, wherein
    the first surface is an upright and outboard facing surface that engages the restraining member to limit lateral movement of the hood attachment part in an inboard direction relative to the body attachment part upon the application of the prescribed force on the hood attachment part.

11. The vehicle hood hinge structure according to claim 10, wherein
    the contact portion includes a second surface that is a downwardly facing surface, and
    the restraining member includes an upwardly facing surface that engages the downwardly facing surface to limit upward movement of the hood attachment part upon the application of the prescribed rearward directed force on the hood attachment part.

12. The vehicle hood hinge structure according to claim 2, wherein
    the contact portion defines an aperture in the body attachment part, and
    the restraining member is spaced apart from the aperture and the first surface while the hood attachment part is in the closed position relative to the body attachment part, with the restraining member having a non-contacting relationship with the body attachment part while moving between the open position and the closed position.

13. The vehicle hood hinge structure according to claim 12, wherein
    the restraining member is moved into the aperture upon application of the prescribed force on the hood attachment part.

14. The vehicle hood hinge structure according to claim 12, wherein
    the body attachment part includes a main body, and the restraining member includes an extension part that is located above a main body of the body attachment part while the hood attachment part is in the closed position.

15. The vehicle hood hinge structure according to claim 14, wherein
the body attachment part has a forward end that is located at a third location that is forward from the second location while the hood is in the closed position relative to the vehicle longitudinal direction.

16. The vehicle hood hinge structure according to claim 15, wherein
the body attachment part includes an upright section that extends upward from the main body, the contact portion defining an aperture in the upright section, the aperture being located rearward from the third location relative to the vehicle longitudinal direction.

17. The vehicle hood hinge structure according to claim 16, wherein
the restraining member includes an extension part that extends outboard of the upright portion of the body attachment part with the hood attachment part in the closed position.

18. A vehicle body structure comprising:
a hood ledge that extends in a vehicle longitudinal direction;
a hinge including a body attachment part fixed to the hood ledge, a hood attachment part, and a hinge part connecting the body attachment part and the hood attachment part for movement between a hood closed position and a hood open position;
a hood fixed to the hood attachment part for movement between the hood closed position and the hood open position with respect to the hood ledge, the hood including a front edge, a rear edge, a first side edge and a second side edge, with the first side edge and the front edge defining a front corner and the first side edge and the rear edge defining a rear corner,
with one of the body attachment part and the hood attachment part having a restraining member formed thereon, and the other of the body attachment part and the hood attachment part having a contact portion formed thereon, the restraining member being located adjacent the contact portion while the hood is in the hood closed position such that the contact portion engages the restraining member at a second location forward of the first location relative to a vehicle longitudinal direction to restrain movement of the hood attachment part and the hood relative to the body attachment part upon application of a prescribed force on at least one of the body attachment part and the hood attachment part where at least one of the body attachment part and the hood attachment part is moved in a lateral direction to a deformed state while the hood attachment part and the hood are in the hood closed position.

* * * * *